(No Model.)

W. WINDUS.
CHRISTMAS TREE HOLDER.

No. 497,999. Patented May 23, 1893.

WITNESSES:
A. O. Babendreier
Parker Davis

INVENTOR:
Werner Windus,
By Chas. B. Mann
atty

UNITED STATES PATENT OFFICE.

WERNER WINDUS, OF BALTIMORE, MARYLAND.

CHRISTMAS-TREE HOLDER.

SPECIFICATION forming part of Letters Patent No. 497,999, dated May 23, 1893.

Application filed October 3, 1892. Serial No. 447,618. (No model.)

*To all whom it may concern:*

Be it known that I, WERNER WINDUS, a citizen of the United States, residing at Baltimore city, in the State of Maryland, have invented certain new and useful Improvements in Christmas-Tree Holders, of which the following is a specification.

This invention relates to a metal holder or socket for supporting Christmas trees in an upright position.

The invention will first be described and then pointed out in the claims.

Figure 1:
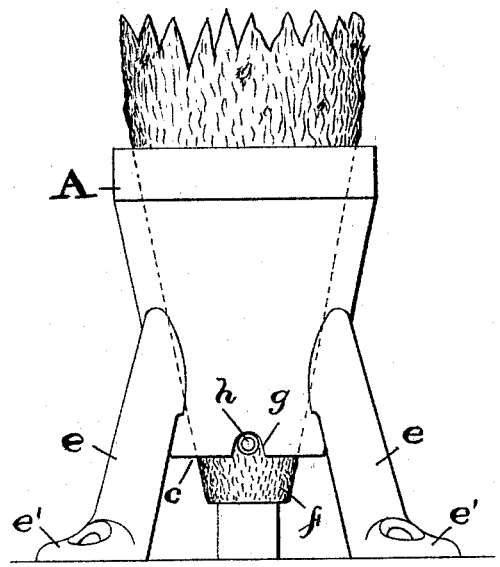
Figure 2:
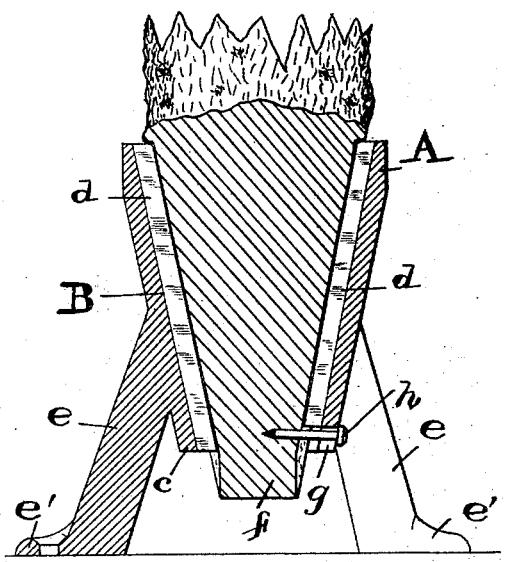
Figure 3:
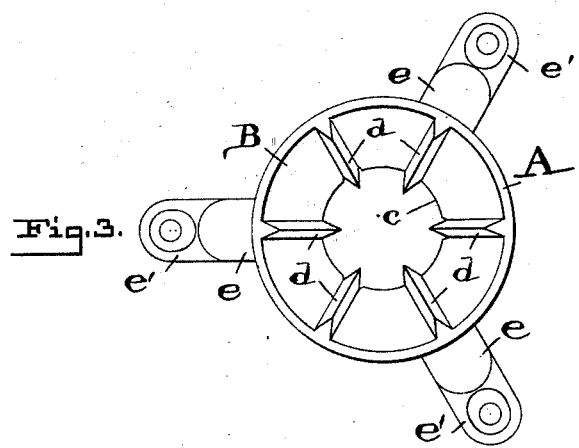

In the drawings,—Figure 1 is a side view of the holder and the stump-end of a tree. Fig. 2 is a vertical section of the holder and stump-end of a tree. Fig. 3 is a top-view of the holder.

The letter, A, designates a body having a conical tapered socket, B, the large end being uppermost and open and having no bottom but open at the lower end, c, the same as at the upper. The inner wall of this socket is provided with sharp-edged vertical ribs or flanges, d, extending from top to bottom; these ribs are rigidly attached to the wall being cast integral therewith. Legs, e, are attached to the exterior tapered part of the body at a point above the lower end, c, and support the body and socket at an elevation, that is, the open lower end, c, of the socket depends downward between the legs but does not touch the base or other support whereon the legs or feet rest; therefore the said hollow lower end is free to allow the end, f, of the tree-stump to project below it; this lower end, c, is provided with notches, g, either one of which may receive a nail, h, that may be driven laterally into the end, f, of the tree stump. The legs have feet, e', each of which has a hole to receive a screw or bolt for securing the holder to a suitable wood-base.

It will be seen that to use this holder properly a Christmas tree should have its stump-end tapered and then the said tapered end should be jammed hard down into the tapered socket, B; by this action the sharp edges of the internal ribs, d, will be forced into the wood of the tree and the end, f, thereof will project below the open end of the socket. A nail, h, may then be driven laterally into the said end, f,—the notch, g, in the end of the body facilitating the entry of the nail, and the latter serving as a key to fasten the tree and prevent its withdrawal from the socket. By this construction the holder is very efficient, its grip on the tree is firm and rigid, and it is cheap to manufacture.

I may use the device for holding other things beside Christmas trees.

Having thus described my invention, what I claim as new, and desire to secure by Letters Patent, is—

1. The herein-described holder comprising a metal body having a conical tapered socket, large end uppermost, open at both the upper and lower end, and provided with internal sharp-edged vertical ribs, as set forth.

2. The herein-described holder comprising a metal body having a conical tapered socket, large end uppermost, open at both the upper and lower end, provided with internal sharp-edged vertical ribs, and supported by legs attached to the body at a point above its lower end, whereby the said open lower end depends between the legs and is at an elevation above the base whereon the legs rest, as and for the purpose set forth.

In testimony whereof I affix my signature in the presence of two witnesses.

WERNER WINDUS.

Witnesses:
JNO. T. MADDOX,
F. PARKER DAVIS.